United States Patent [19]

Rau et al.

[11] Patent Number: 5,159,011

[45] Date of Patent: Oct. 27, 1992

[54] AQUEOUS FORMULATIONS OF COPOLYMER LATICES AND POLYISOCYANATE DISPERSIONS

[75] Inventors: Maria G. Rau, Bad Durkheim; Rainer Blum, Ludwigshafen; Gerd Louis, Carlsberg, all of Fed. Rep. of Germany

[73] Assignee: BASF Aktiengesellschaft, Ludwigshafen, Fed. Rep. of Germany

[21] Appl. No.: 730,468

[22] Filed: Jul. 16, 1991

[30] Foreign Application Priority Data

Jul. 16, 1990 [DE] Fed. Rep. of Germany ....... 4022602

[51] Int. Cl.⁵ .............. C08L 33/06; C08L 31/02; C08L 25/16; C08L 75/00
[52] U.S. Cl. .................. 524/562; 524/564; 524/577; 524/591
[58] Field of Search ............... 524/562, 591

[56] References Cited

U.S. PATENT DOCUMENTS

| | | |
|---|---|---|
| 4,029,626 | 6/1977 | Gillemot et al. |
| 4,639,499 | 1/1987 | Höhlein et al. ............ 526/285 |
| 4,730,021 | 3/1988 | Zom et al. ............ 524/457 |

FOREIGN PATENT DOCUMENTS

| | | |
|---|---|---|
| 0204970 | 12/1986 | European Pat. Off. . |
| 0212511 | 3/1987 | European Pat. Off. . |
| 1487766 | 10/1977 | United Kingdom . |

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Aqueous formulations of copolymer latices and polyisocyanate dispersions, containing A) from 5 to 40% by weight of one or more synthetic resins of
  (a) from 0.1 to 20 parts by weight of one or more monoolefinically unsaturated monomers which carry one or more groups which are reactive with isocyanates and
  (b) from 80 to 99.9 parts by weight of one or more mono- or diolefinically unsaturated monomers which are copolymerizable with (a) and have no acidic hydrogen atoms,
B) from 0.5 to 5% by weight of one or more finely divided, stabilized polyisocyanates,
C) effective amounts of dispersants and
D) from 5 to 40% by weight of one or more finely divided fillers, are used as coating materials for woven and nonwoven substrates.

9 Claims, No Drawings

AQUEOUS FORMULATIONS OF COPOLYMER LATICES AND POLYISOCYANATE DISPERSIONS

The present invention relates to novel aqueous formulations of copolymer latices and polyisocyanate dispersions, containing A) from 5 to 40% by weight of one or more synthetic resins of
  (a) from 0.1 to 20 parts by weight of one or more monoolefinically unsaturated monomers which carry one or more groups which are reactive with isocyanates and
  (b) from 80 to 99.9 parts by weight of one or more mono- or diolefinically unsaturated monomers which are copolymerizable with (a) and have no acidic hydrogen atoms,
B) from 0.5 to 5% by weight of one or more finely divided, stabilized polyisocyanates,
C) effective amounts of dispersants and
D) from 5 to 40% by weight of one or more finely divided fillers.

The present invention furthermore relates to a process for the preparation of these aqueous formulations and their use as coating materials for woven and nonwoven substrates.

Coating materials or binders for substrates, in particular woven textile substrates are intended to impart improved performance characteristics to the substrate. The most important objects of a binder are to increase the mechanical strength without substantially changing the rigidity and to reduce the water sensitivity, i.e. to increase the wet strength.

The combination of polyisocyanates with polymers which contain groups which are reactive with isocyanates is known for this purpose.

However, the fact that the isocyanate groups react with the intended reactants, for example alcohols, amines or carboxamides, at as low as room temperature gives rise to considerable difficulties; i.e. it is not possible to formulate combinations having a long shelf life.

To overcome this difficulty, two-component systems are frequently used. The reactants are kept in separate formulations and are not mixed until directly before application, after which the reaction then takes place spontaneously or is accelerated by heat and/or catalysis, as described in, for example, U.S. Pat. No. 4,029,626 (1).

The disadvantages of this process are the necessity of separate formulation and storage of the two components, the difficulties in exact metering and thorough mixing prior to application and the danger of blockage of the mixers and application apparatuses as a result of premature reaction. Furthermore, aqueous binder systems are not obtainable by this method since the water is a reactant for isocyanates.

Stable systems can be formulated if the polyisocyanates are first reacted with a monofunctional reactant. The adducts obtained are referred to as blocked isocyanates if they are less heat-stable than the products of the crosslinking reaction intended to take place subsequently on the fabric or substrate. Under the action of heat, the blocking agent is eliminated and the polyisocyanate forms the more heat-stable bond with crosslinking.

An example of such a development is described in DE-A 24 54 253 (2), which describes copolymers of acrylate and/or vinylidene monomers which are prepared by block, suspension, solution or emulsion polymerization of ethylenically unsaturated blocked aromatic diisocyanates. The blocking agents used for the isocyanate groups are oximes, benzimidazole, pyrazoles, benzotriazoles, caprolactam, thiocaprolactam and p-nitroaniline. The required wet strength is achieved through crosslinking or vulcanization of these copolymers.

This method has the disadvantage that the ethylenically unsaturated blocked isocyanates have to be prepared in an expensive three-stage process, with all the problems of intermediate isolation, purification and optimization of process. Furthermore, the stability of these blocked isocyanates is crucial for the reactivity (effectiveness of crosslinking) and for the shelf life. In particular, technical and economic disadvantages of such formulations are due to the eliminated blocking agent, which, when it remains in the crosslinked material, changes the properties of the latter or, when it evaporates, has to be recovered or at least removed from the waste air.

EP-A 204 970 (3) relates to a process for the preparation of stable dispersions of finely divided polyisocyanates. EP-B 212 511 (4) describes the use of such stable polyisocyanate dispersions as crosslinking agents in textile pigment print pastes and dye liquors.

It is an object of the present invention to provide aqueous coating materials for woven and nonwoven substrates, which coating materials do not have the described disadvantages of the prior art.

We have found that this object is achieved by the aqueous formulations defined at the outset, of copolymer latices having functional groups which are reactive with isocyanates and aqueous stable polyisocyanate dispersions.

Groups which are reactive with isocyanates are essentially groups having acidic hydrogen atoms, in particular the hydroxyl, amino, carboxyl and carboxamido group.

The synthetic resins A contained in the copolymer latices are based on, as monomers (a), in particular compounds of the general formula I

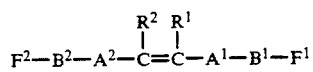

where
R$^1$ and R$^2$ are each hydrogen, methyl or ethyl,
A$^1$ and A$^2$ are each o-, m- or p-phenylene, a divalent group of the formula

where X and Y are each O, S, NH, NCH$_3$ or NC$_2$H$_5$ and the carbon atom is directly bonded to the olefinic double bond, or a single bond,
B$^1$ and B$^2$ are each C$_1$–C$_{18}$-alkylene which may be interrupted by one or more nonadjacent oxygen atoms and additionally may carry a hydroxyl or amino group, or a single bond,
F$^1$ and F$^2$ are each hydrogen, C$_1$–C$_{18}$-alkyl which may be interrupted by one or more nonadjacent oxygen atoms and additionally may carry a hydroxyl or amino group, or a radical of the formula

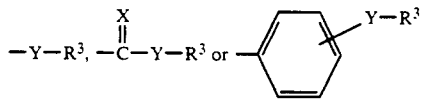

where $R^3$ is hydrogen or $C_1$-$C_{18}$-alkyl which may be interrupted by one or more nonadjacent oxygen atoms and additionally may carry a hydroxyl or amino group, and $A^1$ and $A^2$ or $A^1$ and $F^2$ may be bonded via Y as a bridge member to form a five-membered or six-membered ring, with the proviso that the compound I carries one or more groups which are reactive with isocyanates.

In a particularly preferred embodiment, the monomer (a) is a compound of the general formula Ia or Ib

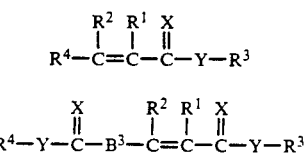

where $R^3$ and $R^4$ are each hydrogen or $C_1$-$C_{18}$-alkyl which may be interrupted by one or more nonadjacent oxygen atoms and additionally may carry a hydroxyl or amino group and $B^3$ is a single bond or $C_1$-$C_4$-alkylene, and the compounds Ib may form a five-membered or six-membered ring with elimination of the radicals $R^3$ and $R^4$ and a group Y with the proviso that the compound Ia or Ib carries one or more groups which are reactive with isocyanates.

Examples of compounds Ia are acrylic acid, methacrylic acid, crotonic acid, 2-hydroxyethyl acrylate, 2-hydroxyethyl methacrylate, 3-hydroxypropyl acrylate, 3-hydroxypropyl methacrylate, 2-aminoethyl acrylate, 2-aminoethyl methacrylate, 3-aminopropyl acrylate, 3-aminopropyl methacrylate, acrylamide, methacrylamide, N-(2-hydroxyethyl)acrylamide and N-(3-hydroxypropyl)methacrylamide.

Examples of compounds Ib are maleic acid, fumaric acid, itaconic acid, maleic anhydride and itaconic anhydride, and monomethyl maleate, monoethyl maleate, monobutyl maleate, mono-2-ethylhexyl maleate, monodecyl maleate, monododecyl maleate, monomyristyl maleate, monocetyl maleate, monostearyl maleate and the corresponding monoalkyl fumarates.

The synthetic resins A contained in the copolymer latices are based on, as monomers (b), in particular compounds from the following classes of substances:

α,β-unsaturated carboxylic esters of the formula IIa

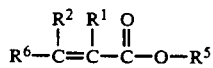

vinyl esters of the general formula IIb

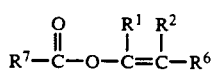

vinylbenzenes of the general formula IIc

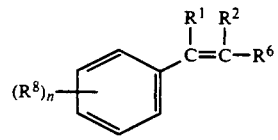

and unsaturated aliphatic hydrocarbons of 4 to 8 carbon atoms of the general formula IId

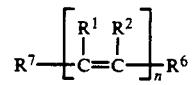

$R^5$ is $C_1$-$C_{18}$-alkyl, in particular $C_1$-$C_{12}$-alkyl, or saturated or unsaturated $C_3$-$C_{10}$-cycloalkyl, in particular cyclopentyl, cyclohexyl, cyclopentadienyl or adamantyl, $R^6$ and $R^7$ are each hydrogen or $C_1$-$C_{18}$-alkyl, in particular $C_1$-$C_{12}$-alkyl, $R^8$ is hydrogen, $C_1$-$C_4$-alkyl, in particular methyl or ethyl, $C_1$-$C_4$-alkoxy, in particular methoxy or ethoxy, chlorine, bromine, nitro or cyano and n is 1 or 2.

Examples of compounds IIa are methyl acrylate, ethyl acrylate, propyl acrylate, isopropyl acrylate, butyl acrylate, isobutyl acrylate, sec-butyl acrylate, tert-butyl acrylate, pentyl acrylate, isopentyl acrylate, neopentyl acrylate, nonyl acrylate, isononyl acrylate, decyl acrylate, dodecyl acrylate, cyclohexyl acrylate, cyclopentadienyl acrylate and adamantyl acrylate and the corresponding methacrylates.

Examples of compounds IIb are vinyl formate, vinyl acetate and vinyl propionate.

Examples of compounds IIc are styrene and alkyl-substituted styrenes, such as 2-methyl- and 4-methylstyrene.

Examples of compounds IId are 1-butene, 2-butene, isoprene and butadiene.

Only comonomers (b) whose corresponding homopolymers have a glass transition temperature ($T_G$) of from $-45°$ to $+50°$ C. should be chosen for synthetic resin A. If continuous film formation is to take place on the coated substrates without the addition of a plasticizer, a $T_G$ range of from $-45°$ to $+25°$ C. is preferred. If in addition pronounced tack of the binder film is to be avoided, a $T_G$ range of from $-20°$ to $+25°$ C. is advantageously chosen.

For good water resistance of the coated substrates, hydrophobic comonomers (b) are used or concomitantly used, for example tert-butyl methacrylate, n-butyl methacrylate or 2-ethylhexyl acrylate. Cyclopentadienyl or adamantyl acrylates or methacrylates also have an advantageous effect on the water resistance.

The synthetic resin A may consist of one or more of each of the monomer components (a) and (b). It may be advantageous to use a mixture of monomers (b) which have a lower $T_G$, e.g. 2-ethylhexyl acrylate, n-butyl acrylate or ethyl acrylate, and monomers (b) which have a higher $T_G$, e.g. methyl methacrylate, tert-butyl methacrylate, methyl acrylate, dodecyl acrylate or styrene, together with one or more monomers (a) as components for the synthetic resin A.

In the preparation of the copolymer latex containing the synthetic resin A, the known preparation processes may be used in order to produce a latex particle morphology which meets the requirements. The following preparation processes are particularly suitable:

Dispersing mass copolymers in water
Dispersing precipitated solution copolymers in water
Suspension copolymerization in water
Emulsion copolymerization in water
Preparation of secondary dispersions.

Emulsion polymerization in water has proven particularly advantageous.

Depending on the preparation process, a batch, semicontinuous or continuous emulsion or monomer feed procedure or a seed polymerization process may be chosen. The emulsion or monomer feeds can be introduced into the reaction vessel in succession at a constant rate or with overlapping feed times in a stepwise procedure or in succession at increasing or decreasing rates or with overlapping feed times in a gradient procedure. These statements also apply to the initiator feeds where these are metered separately.

In the case of a particle morphology which is preferred for the purposes of the present invention, the functional groups which are reactive with isocyanates are preferably present at the surface of the latex particle and in regions close to the surface of said particle. Very high flexibility is thus combined with highly effective crosslinking and hence high wet strength and optimum binder viscosity are achieved.

The manner in which the various polymerizations have to be established, depending on the preparation process, in order to achieve the stated preferred copolymer latex morphologies is familiar to the skilled worker and therefore requires no further explanation.

In the preparation of the suitable latices, anionic or nonionic emulsifiers or protective colloids of known types, or mixtures thereof, may be used. Examples of emulsifiers are nonylphenol reacted with 25 moles of ethylene oxide and sodium nonylphenolsulfonate reacted with 25 moles of ethylene oxide, and examples of protective colloids or starch derivatives, such as carboxymethylcellulose and polyvinyl alcohol derivatives.

Depending on the polymerization process, the initiators used in the conventional amounts may be initiators which are water-soluble or soluble in the organic phase, such as thermally decomposable alkali metal and ammonium peroxides, e.g. potassium peroxodisulfate or ammonium peroxodisulfate, organic peroxides, e.g. tert-butyl peroxide, or redox initiators, such as hydrogen peroxide/ascorbic acid or tert-butyl hydroperoxide/sodium hydroxymethylsulfinate.

The polymer content of the copolymer latices is preferably from 50 to 55% by weight. The viscosity of these latices, which should be from 200 to 1500 mPa.s at room temperature, is decisive for obtaining sedimentation-free binder compositions with the polyisocyanate dispersion used.

The preparation of the aqueous stable polyisocyanate dispersions B used is described in detail in publications (3) and (4). In the case of the present invention, the passivation of the polyisocyanate particle surface with respect to the reactant water and to the groups of synthetic resin A which are reactive to isocyanates is utilized in order to prepare one-component systems which have a long shelf life and can be used after storage without loss of reactivity. In this connection, the term retarded reactivity or retarded aqueous polyisocyanate dispersions is also used.

This deactivation of the particle surface or retardation is achieved by virtue of the fact that only the isocyanate groups present on the surface of the particles react with a deactivating agent and prevent the polyisocyanate molecules present in the interior of the particle from reacting with the substances which are known to react with isocyanates. After the deactivation of the polyisocyanates, stable dispersions are obtained directly by dispersing the particles in a dispersion medium.

Suitable solid finely divided polyisocyanates are those substances which have a melting point above 25° C., preferably above 40° C. These include aliphatic, araliphatic, aromatic and heterocyclic polyisocyanates, polyphenylpolymethylene polyisocyanates, which are obtained by aniline/formaldehyde condensation and subsequent phosgenation, perchlorinated aryl polyisocyanates, carbodiimide-containing polyisocyanates, allophanate-containing polyisocyanates, isocyanurate-containing polyisocyanates, polyisocyanates containing urethane or urea groups, acylated polyisocyanates containing urea groups, biuret-containing polyisocyanates, polyisocyanates prepared by telomerization reaction, ester-containing polyisocyanates and uretdione-containing diisocyanates and urea-containing diisocyanates. Specific examples of suitable polyisocyanates of this type are:

| | |
|---|---|
| p-Xylylene diisocyanate | mp. 45–46° C. |
| 1, 5-Diisocyanatomethylnaphthalene | 88–89° C. |
| 1, 3-Phenylene diisocyanate | 51° C. |
| 1, 4-Phenylene diisocyanate | 94–96° C. |
| 1-Methyl-2, 5-diisocyanatobenzene | 39° C. |
| 1, 3-Dimethyl-4, 6-diisocyanatobenzene | 70–71° C. |
| 1, 4-Dimethyl-2, 5-diisocyanatobenzene | mp. 76° C. |
| 1-Nitro-2, 5-diisocyanatobenzene | 59–61° C. |
| 1, 4-Dichloro-2, 5-diisocyanatobenzene | 134–137° C. |
| 1-Methoxy-2, 4-diisocyanatobenzene | 75° C. |
| 1-Methoxy-2, 5-diisocyanatobenzene | 89° C. |
| 1, 3-Dimethoxy-4, 6-diisocyanatobenzene | 125° C. |
| 4, 4'-Diisocyanatoazobenzene | 158–161° C. |
| 4, 4'-Diisocyanatodiphenyl ether | 66–68° C. |
| 4, 4'-Diisocyanatodiphenylmethane | 42° C. |
| 4, 4'-Diisocyanatodiphenyldimethylmethane | 92° C. |
| 1, 5-Diisocyanatonaphthalene | 130–132° C. |
| 3, 3'-Dimethyl-4, 4'-diisocyanatodiphenyl | 68–69° C. |
| 4, 4'-Diisocyanatodiphenyl disulfide | 58–60° C. |
| 4, 4'-Diisocyanatodiphenyl sulfone | 154° C. |
| 1-Methyl-2, 4, 6-triisocyanatobenzene | 75° C. |
| 1, 3, 5-Trimethyl-2, 4, 6-triisocyanatobenzene | 93° C. |
| 4, 4', 4''-Triisocyanatotriphenylmethane | 89–90° C. |
| 4, 4'-Diisocyanato-1, 2-diphenylethane | 88–90° C. |
| Dimeric 1-methyl-2, 4-phenylene diisocyanate | 156° C. |
| Dimeric 1-isopropyl-2, 4-phenylene diisocyanate | 125° C. |
| Dimeric 1-chloro-2, 4-phenylene diisocyanate | 177° C. |
| Dimeric 2, 4'-diisocyanatodiphenyl sulfide | 178–180° C. |
| Dimeric 4, 4'-diisocyanatodiphenylmethane | |
| 3, 3'-Diisocyanato-4, 4'-dimethyl-N, N'-diphenylurea | |
| N, N'-Bis-[4-(4-isocyanatophenylmethyl)-phenyl]-urea | |
| N, N'-Bis-[4-(2-isocyanatophenylmethyl)-phenyl]-urea | |

In a preferred embodiment, araliphatic or aromatic di-, tri- or tetraisocyanates, which may be in their dimeric forms, are used as finely divided stabilized polyisocyanates of component B of the novel aqueous formulations. Examples of typical preferred components B are 1,5-diisocyanatonaphthalene, 3,3'-diisocyanato-4,4'-dimethyl-N,N'-diphenylurea, dimeric 1-methyl-2,4-phenylene diisocyanate, dimeric 4,4'-diisocyanatodiphenylmethane and 3,3'-dimethyl-4,4'-diisocyanatobiphenyl.

The polyisocyanates can be deactivated using the methods described in the abovementioned publications (3) and (4). For example, compounds having hydroxyl, carboxyl, amide and mercaptan groups are suitable for the deactivation. Compounds of this type form a type of polymer coat on the surface of the polyisocyanate particles by selectively reacting with the isocyanate groups which are present on the particle surface. The polymer coat is thus firmly bound to the polyisocyanate particles without substantial proportions of the total amount of isocyanate groups present in the polyisocyanate particles being consumed.

Reactions which convert the isocyanate groups into urea or polyurea structures are particularly suitable for deactivating the isocyanate groups at the surface of the polyisocyanate particles. Such deactivating agents are, for example, water and primary or secondary amines. It is also possible to use bifunctional or polyfunctional, low molecular weight or high molecular weight compounds having aliphatically bonded, primary or secondary amino groups or —CO—NH—NH$_2$ terminal groups or hydrazines having a molecular weight of from 32 to about 60,000, preferably from 60 to 3,000, for deactivating the particle surfaces of the polyisocyanates. These are, for example, low molecular weight or high molecular weight primary or secondary polyamines, preferably diamines. Amino groups are generally bonded to aliphatic groups, to cycloaliphatic groups or to the aliphatic radical of araliphatic groups.

It is also possible to use hydrazine (generally in the form of hydrazine hydrate) or alkyl-substituted hydrazines, such as N,N-dimethylhydrazine. Compounds having terminal hydrazine groups, e.g. dihydrazides, such as oxalic dihydrazide, adipic dihydrazide or terephthalic dihydrazide, or compounds having hydrazide and semicarbazide, carbazine ester or amino groups, e.g. β-semicarbazidoalanylhydrazide, 2-semicarbazidoethylenecarbazine esters, aminoacetic hydrazide, β-aminopropionic hydrazide or ethylenebiscarbazine esters or ethylenebissemicarbazide, and polyhydrazides which are obtained by hydrazinolysis of polyacrylates are also suitable for deactivating the surface of the polyisocyanates.

However, essentially aliphatic or cycloaliphatic di- and polyamines which, in addition to the amino groups, may furthermore have OH, tertiary amino, ether, thioether, urethane or urea groups are preferred.

The following di- and polyamines are preferably used: linear α,ω-C$_2$-C$_{12}$-diaminoalkanes, e.g. 1,4-butanediamine, 1,6-hexanediamine, 1,10-decanediamine, 1,11-undecanediamine or 1,12-dodecanediamine; branched α,ω-diaminoalkanes, e.g. neopentanediamine, 2,2,4- or 2,4,4-trimethyl-1,6-diaminohexane, 2,5-dimethyl-2,5-diaminohexane or 2,2-dimethyl-1,5-diaminopentane;

diaminoalkylcycloalkanes, e.g. bisaminomethylhexahydro-4,7-methanoindane (TCD-amine);

mono-, di- and trialkylcyclohexanediamines, e.g. 1,3- or 1,4-cyclohexanediamine, 1-amino-3,3,5-trimethyl-5-aminomethylcyclohexane (isophoronediamine) or 2,4- or 2,6-diamino-3,5-diethyl-1-methylcyclohexane;

arylenediamines, e.g. p- or m-xylylenediamine;

bis-(ω-aminoalkyl)-alkylamines, e.g. bis-(3-aminopropyl)methylamine;

triaminoalkanes and -cycloalkanes, e.g. 1,5,11-triaminoundecane or 4-aminomethyl-1,8-diaminooctane;

diaminodicyclohexylmethanes, e.g. 2,4,'- or 4,4'-diaminodicyclohexylmethane, 3,3-dimethyl-5,5'-diaminodicyclohexylmethane or 3,5-diisopropyl-3',5'-diethyl-4,4'-diaminodicyclohexylmethane;

perhydrogenated condensed diamino aromatics, e.g. perhydrogenated diaminonaphthalenes or -anthracenes;

relatively highly condensed aliphatic and cycloaliphatic amines, e.g. diethylenetriamine or tripropylenetetramine;

N,N'-dialkylalkylenediamines, e.g. N,N'-dimethylethylenediamine;

piperazine and piperazine derivatives, e.g. piperazine hydrate, 2-methylpiperazine or 2-(2-hydroxyethyl)-piperazine;

polyalkyleneoxydiamines, e.g. 4,7-dioxadecane-1,10-diamine.

In addition to these low molecular weight diamines or as a mixture with them, it is also possible to use higher molecular weight di- and polyamines, as obtainable, for example, by amination of polyoxyalkylene glycols with ammonia.

Other very suitable and therefore likewise preferred higher molecular weight polyamines are the commercial substances (polyamidoamines) prepared by polycondensation with polycarboxylic acids, for example polymeric linseed oil fatty acid, with an excess of diand triamines. These higher molecular weight polyamines have molecular weights of from about 400 to 6,000, preferably from 400 to 3,000. Because of their structure, such higher molecular weight polyamines are particularly suitable for forming a strong, resilient polyurethane coating. They are therefore used, preferably as a mixture with the low molecular weight di- and polyamino compounds, for deactivating the surface of the polyisocyanate particles.

It is of course possible to use any combinations of the stated amine, hydrazine and hydrazide compounds in order, for example, to offset disadvantageous side effects of an amine by corresponding advantages of other amines (for example low molecular weight and higher molecular weight diamines used together) or to combine as many advantageous side effects as possible. For example, combinations of rapidly reacting amines, e.g. ethylenediamine, with amines slowed down by steric hindrance, or of low molecular weight amines or hydrazines with high molecular weight amines, for example aliphatic aminopolyethers, are suitable.

In order to control and to accelerate the deactivation, catalysts may also be added. Catalysts which selectively accelerate the deactivation are preferred. The deactivation catalysts can, however, also be identical with the catalysts which subsequently accelerate or control the intended heat-activated reaction.

The solid, finely divided polyisocyanates can be dispersed virtually in any dispersion medium which is liquid above 20° C., for example in alcohols, polyols, amines, ethers, ketones, esters, carboxylic acids, aliphatic or aromatic hydrocarbons, halohydrocarbons and water. For the novel aqueous formulations containing the finely divided polyisocyanates, preferably used dispersion media are water or mixtures of liquid paraffin, benzene boiling within a range from 140° to 250° C., xylene or toluene with water. However, water alone is particularly preferred.

The known finely divided polyisocyanate dispersions have a very wide particle size distribution and are less suitable in this form for use according to the invention. However, they can very readily be converted into a more suitable form by bringing these polyisocyanate dispersions into a mean particle size of from 0.1 to 15, preferably from 0.5 to 5, μm (determined using a Joice Label disk centrifuge). Such finely divided polyisocyanate dispersions can be very easily prepared by subjecting the known dispersions to fine dispersing or milling. For example, high-speed dissolvers or dispersing apparatuses of the rotor/stator type or stirred ball mills, bead mills, sand mills, ball mills and attrition mills are suitable for this purpose. The finely divided polyisocyanate dispersions to be used according to the invention are preferably obtained by milling deactivated solid, finely divided polyisocyanates. If milling of the polyisocyanates is carried out in the presence of substances which react with isocyanate groups, the temperature during milling must not exceed 50° C. Milling is preferably carried out at from 0° to 40° C., in particular from 10° to 40° C.

When the finely divided polyisocyanate dispersions are heated at higher temperatures, for example to above 60° C., deactivation of the surface of the polyisocyanate particles is eliminated and a reaction occurs between the polyisocyanates and the compounds which react with isocyanate groups.

During milling, it is also possible to use surfactants or protective colloids in order to prepare particularly stable polyisocyanate dispersions. Suitable surfactants are conventional anionic, cationic or neutral surfactants, for example sorbitan fatty acid esters, polyoxyethylene sorbitan fatty acid esters, arylsulfonates, alkali metal salts of higher fatty acids, oxyethylated amines, such as oxyethylated oleylamine, sulfosuccinic esters, soybean lecithin, ethoxylated fatty acid esters, propoxylated fatty acid esters and condensates of phenolsulfonic acids, urea and formaldehyde. Viscosity-regulating substances, such as cellulose ethers, methylcellulose, polymeric acids and salts of polymeric acids (e.g. polyacrylic acid), natural and synthetic polysaccharides and protein products, cationic starch, polyacrylamides, polyvinyl alcohols and polyvinyl ethers may also be used.

The dispersants C used, which must be present in an effective amount which may differ depending on the system used and is therefore difficult to express in exact numerical values, are, for example, the abovementioned surfactants or protective colloids, which can be added to the polyisocyanates A before or during the milling process. These include the dispersants and emulsifiers which can be added during the preparation of the copolymer latex, for example ethoxylated nonylphenol and sodium nonylphenolsulfonate.

Particularly suitable finely divided fillers D are inert inorganic materials and pigments, e.g. barium sulfate, alumina and titanium dioxide.

The novel aqueous formulations contain from 5 to 40, preferably from 15 to 40%, by weight of component A, from 0.5 to 5, preferably from 0.5 to 3%, by weight of component B, from 5 to 40, preferably from 15 to 40%, by weight of component D and dispersant C, not less than 20, preferably not less than 30%, by weight of water and, if required, further conventional dispersing media and assistants.

The dispersing media stated above for the polyisocyanates B may be regarded as further conventional dispersing media. The conventional assistants used may be, for example, the abovementioned viscosity-regulating substances, the usual foam stabilizers and the usual pore regulators.

The molar ratio of the functional groups present in the synthetic resins A and reacting with isocyanate groups to the free, i.e. nonstabilized, isocyanate groups of the polyisocyanates B should be from 2:1 to 1:2.

The weight ratio of the synthetic resin A to the filler D should be from 1:2 to 2:1.

The novel aqueous formulations which contain synthetic resins A, polyisocyanates B, dispersants C and fillers D as components are prepared by mixing the stated components with water and, if required, other conventional dispersants and assistants. Components A to D may be mixed individually or in groups with water, further dispersing media and assistants and then combined, or the mixture of components A to D as a whole can be mixed with water, further dispersing media and assistants.

In a preferred embodiment, the novel aqueous formulations are prepared by mixing the aqueous copolymer latices containing the synthetic resins A with aqueous dispersions of the polyisocyanates B and with dispersants C and then adding the fillers D and, if required, further conventional assistants.

The novel combination of the aqueous functionalized copolymer latices with preferably aqueous, retarded polyisocyanate dispersions is particularly suitable for foamed and nonfoamed coatings having good adhesion and wet strength on woven and nonwoven substrates.

In particular, textile materials of cotton, viscose staple fiber, polyester, polyamide and polypropylene can be used as woven substrates. Particularly suitable nonwoven substrates are natural or synthetic leather materials and nonwovens of polyester, polyamide, polypropylene or viscose staple fiber.

Crosslinking of the novel combination is carried out at a relatively high temperature, i.e. after application and/or during drying. Under the conventional drying conditions of not less than 100°-120° C., the isocyanate groups are liberated and react immediately with the reactive groups of the copolymer.

The novel aqueous formulations have many advantages. In the formulations, organic solvents as dispersants are predominantly or completely dispensed with, which is welcome from the ecological point of view. The use of a one-component system instead of the two-component system still conventionally used represented a considerable simplification. Compared with the completely blocked isocyanate systems of the prior art, the novel aqueous formulations have the advantage that very small amounts, if any, of cleavage products which reduce the coating quality and are harmful to health are released from the blocking agents during the coating process.

Since the polyisocyanate dispersions used contain only solid, nonvolatile polyisocyanates, there is no emission of undesirable or harmful polyisocyanates or compounds derived therefrom during heating and drying of the coated substrates. Since the retarded polyisocyanate dispersions are used in amounts such that all or virtually all of the isocyanate groups react with the functional groups of the synthetic resin A, an excess of isocyanate in the formulation and hence the formation of residues is avoided.

Despite the presence of a one-component system, the novel aqueous dispersions have a long shelf life; after 6 months, for example, there are still no marked increase in viscosity, no sedimentation and no significant loss of reactivity. The pot life is from 1 to 2 years or even longer.

The substrates coated with the novel aqueous dispersions have excellent performance characteristics. The foamed or nonfoamed coatings have high wet strength, adhere well to the substrate, are flexible and moldable and have a substantial sound-insulating effect. Furthermore, textile fabrics coated in this manner have less rigidity and therefore feel softer. In the dry-cleaning of textile fabrics coated in this manner, the washout loss is substantially smaller.

EXAMPLES

Example 1

Preparation of copolymer latex containing synthetic resin A

An aqueous emulsion of
- 3.6 g of acrylic acid,
- 1.5 g of acrylamide,
- 7.2 g of 3-hydroxypropyl acrylate,
- 18.5 g of styrene,
- 58.0 g of 2-ethylhexyl acrylate,
- 61.2 g of n-butyl acrylate,
- 1.8 g of nohylphenol reacted with 25 moles of ethylene oxide and
- 1.8 g of sodium nonylphenolsulfonate reacted with 25 moles of ethylene oxide in
- 85 g of water were subjected to emulsion polymerization in a conventional polymerization reactor. For this purpose, 1% of the emulsion was initially taken together with 5% of a solution of 1.3 g of sodium peroxodisulfate in 50 g of water and 10% of a solution of 0.6 g of sodium hydroxymethylsulfinate in 50 g of water and initial polymerization was carried out for 15 minutes at 45° C. The remaining amount of the emulsion was added together with 55% of the sodium peroxodisulfate solution and 50% of the sodium hydroxymethylsulfinate solution in the course of 80 minutes at 45° C.

Thereafter, a second aqueous emulsion of
- 3.6 g of acrylic acid,
- 1.5 g of acrylamide,
- 4.7 g of 3-hydroxypropyl acrylate,
- 17.2 g of methyl methacrylate,
- 9.1 g of styrene,
- 31.1 g of 2-ethylhexyl acrylate,
- 32.8 g of n-butyl acrylate,
- 1.8 g of nonylphenol reacted with 25 moles of ethylene oxide and
- 1.8 g of sodium nonylphenolsulfonate reacted with 25 moles of ethylene oxide in
- 60 g of water was metered in over 50 minutes at 45° C., together with the remaining amounts of the sodium peroxodisulfate solution and of the sodium hydroxymethylsulfinate solution. Polymerization was then continued for 2 hours at 70° C., and a further 2.5 g of each of the two abovementioned emulsifiers were added to stabilize the dispersion.

The copolymer latex obtained had a solids content of 52% by weight, a viscosity of 550 mPa.s, a pH of 4.8–5.0 and a light transmittance of 62% (0.01% strength by weight dispersion).

Examples 2a and 2b

Textile coating with foamed copolymer latex/polyisocyanate dispersion

An aqueous formulation of
- 192 g of the copolymer latex from. Example 1,
- 8.6 g of conventional foam stabilizers,
- 0.3 g of a conventional pore regulator,
- 80 g of barium sulfate,
- 20 g of alumina,
- 5 g of titanium dioxide and
- 7.5 g of a 40% strength by weight aqueous polyisocyanate dispersion, prepared from dimeric 1-methyl-2,4-phenylene diisocyanate, 20% of whose isocyanate groups were present in a form deactived with a commercial polyamidoamine and which had a mean particle size of from 1 to 5 μm, was foamed with air in a mixer in the course of from 2 to 3 minutes, applied in a thickness of 7 mm to cotton fabric and dried for 20 minutes at 150° C., cross-linking of the agent taking place during this drying process (Example 2a).

The ratio of the number of moles of the functional groups (COOH, CONH$_2$ and OH) present in the synthetic resin of the copolymer latex to the number of moles of the free, i.e. nondeactivated, isocyanate groups present in the polyisocyanate was 1.4:1.

The experiment, scaled up by a factor of 100, was repeated on the pilot scale (Example 2b), the coating thickness being 5 mm and the drying time at 150° C. being 15 minutes, in contrast to the laboratory-scale experiment.

Table 1 shows the data of the coatings obtained.

TABLE 1

| Data of the coating material of Examples 2a and 2b | | |
|---|---|---|
| Property | Example 2a | Example 2b |
| Viscosity | 1500 mPa·s | 1840 mPa·s |
| Weight per liter | 260 g | 247 g |
| Effective foam height (compared with wet coating) | 95% | 93% |
| Foam surface | smooth | smooth |
| Pore structure | medium to fine | medium to fine |
| Resilience (fingernail test) | good | good |
| Permanent set (22 h/70° C., 50% compression) | 10% | 8.8% |
| Cohesion, dry | 191 N/25 cm$^2$ | 199 N/25 cm$^2$ |
| Cohesion, wet | 135 N/25 cm$^2$ | 135 N/25 cm$^2$ |
| Decrease in cohesion | 29.5% | 32% |
| Compressive strength | 62 N/25 cm$^2$ | 67 N/25 cm$^2$ |
| Bend test (by hand) | crack-free | crack-free |
| Foam viscosity on application to the fabric | fast-flowing to stiff | moderate flow |

Example 3

Textile coating with nonfoamed copolymer lates/polyisocyanate dispersion

An aqueous formulation of
- 192 g of the copolymer latex from Example 1,
- 1 g of a conventional blue pigment for textile printing and textile dyeing,
- 0.2 g of a conventional antifoam,
- 10 g of titanium dioxide,
- 10 g of alumina,
- 80 g of barium sulfate and
- 7.5 g of the polyisocyanate dispersion from Example 2a was applied uniformly to cotton/polyester fabric in a thickness of from about 40 to 50 g/m$^2$ and was dried for 7 minutes at 150° C.

Table 2 shows the data for the fabric obtained, in comparison with fabric coated with a commercial acrylate/acrylonitrile copolymer.

TABLE 2

| Property | Coated fabric | Fabric coated with acrylate/acrylonitrile copolymer (for comparison) |
|---|---|---|
| Viscosity of the coating material | 1610 mPa·s | 1580 mPa·s |
| Coating (dried) | 46.5 g/m² | 45.7 g/m² |
| Rigidity, longitudinal | 34 mN | 72 mN |
| Rigidity, transverse | 16.5 mN | 31 mN |
| _Washing machine test (60°C.):_ | | |
| Abrasion (wet) | Rating 1-2 | Rating 1-2 |
| Washout (dry) | 0.8% by wt. | 0.6% by wt. |
| _Dry-cleaning (30° C., 15 min, 99.5% by weight of perchloroethylene and 0.5% by weight of cleaning enhancer):_ | | |
| Swelling (wet) | slight | slight |
| Abrasion (immediate) | 2-3 | 2 |
| Abrasion (after 5 min) | Rating 2-3 | Rating 2 |
| Washout (dry) | 0.2% by wt. | 0.6% by wt. |

We claim:

1. An aqueous formulation of a copolymer latex and a polyisocyanate dispersion, containing
A) from 5 to 40% by weight of one or more synthetic resins of
   (a) from 0.1 to 20 parts by weight of one or more monoolefinically unsaturated monomers which carry one or more groups which are reactive with isocyanates and
   (b) from 80 to 99.9 parts by weight of one or more mono- or diolefinically unsaturated monomers which are copolymerizable with (a) and have no acidic hydrogen atoms,
B) from 0.5 to 5% by weight of one or more finely divided, stabilized polyisocyanates deactivated with compounds having hydroxyl, carboxyl, amide, mercaptan groups, terminal hydrazine groups, water, primary or secondary amines, or primary or secondary polyamines,
C) effective amounts of dispersants and
D) from 5 to 40% by weight of one or more finely divided fillers.

2. An aqueous formulation of a copolymer latex and a polyisocyanate dispersion as claimed in claim 1 or 9, in which a compound of the formula I

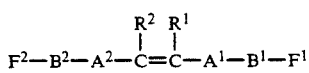

I where
R¹ and R² are each hydrogen, methyl or ethyl,
A¹ and A² are each o-, m- or p-phenylene, a divalent group of the formula

where
X and Y are each O, S, NH, NCH₃ or NC₂H₅ and the carbon atom is directly bonded to the olefinic double bond, or a single bond,
B¹ and B² are each C₁-C₁₈-alkylene which may be interrupted by one or more nonadjacent oxygen atoms and additionally may carry a hydroxyl or amino group, or a single bond,
F¹ and F² are each hydrogen, C₁-C₁₈-alkyl which may be interrupted by one or more nonadjacent oxygen atoms and additionally may carry a hydroxyl or amino group, or a radical of the formula

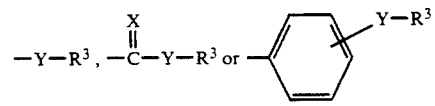

where
R³ is hydrogen or C₁-C₁₈-alkyl which may be interrupted by one or more adjacent oxygen atoms and additionally may carry a hydroxyl or amino group,
and the groups A¹ and A² or A¹ and F² may be bonded via Y as a bridge member to form a five-membered or six-membered ring, with the proviso that the compound I carries one or more groups which are reactive with isocyanates, is used as monomer (a) of synthetic resin A.

3. An aqueous formulation of a copolymer latex and a polyisocyanate dispersion as claimed in claim 2, in which a compound of the formula Ia or Ib

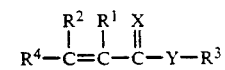

Ia

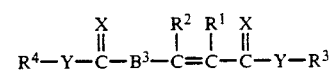

Ib where
R³ and R⁴ are each hydrogen or C₁-C₁₈-alkyl which may be interrupted by one or more nonadjacent oxygen atoms and additionally may carry a hydroxyl or amino group and
B³ is a single bond or C₁-C₄-alkylene,
and the compounds Ib may form a five-membered or six-membered ring with elimination of the radicals R³ and R⁴ and a group Y, with the proviso that the compound Ia or Ib carries one or more groups which are reactive with isocyanates, is used as monomer (a) of synthetic resin A.

4. An aqueous formulation of a copolymer latex and a polyisocyanate dispersion as claimed in claim 1 or 9, in which
an α,β-unsaturated carboxylic ester of the formula IIa

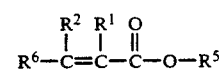

IIa a vinyl ester of the formula IIb

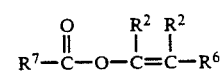

IIb a vinylbenzene of the formula IIc

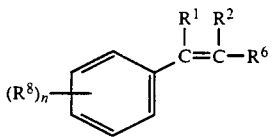  IIc or an unsaturated aliphatic hydrocarbon of 4 to 8 carbon atoms of the formula IId

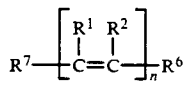  IId where $R^5$ is $C_1-C_{18}$-alkyl or saturated or unsaturated $C_3-C_{10}$-cycloalkyl, $R^6$ and $R^7$ are each hydrogen or $C_1-C_{18}$-alkyl, $R^8$ is hydrogen, $C_1-C_4$-alkyl, $C_1-C_4$-alkoxy, chlorine, bromine, nitro or cyano and n is 1 or 2, is used as monomer (b) of synthetic resin A.

5. An aqueous formulation of a copolymer latex and a polyisocyanate dispersion as claimed in claim 1 or 9, in which araliphatic or aromatic di-, tri- or tetraisocyanates, which may be present in their dimeric forms, are used as finely divided, stabilized polyisocyanates B.

6. A process for the preparation of an aqueous formulation of a copolymer latex and a polyisocyanate dispersion as claimed in claim 1 or 9, wherein components A to D are mixed with water and, if required, further conventional dispersing media and assistants.

7. A process for the preparation of an aqueous formulation of a copolymer latex and a polyisocyanate dispersion as claimed in claim 6, wherein the aqueous copolymer latex containing synthetic resin A is mixed with the aqueous dispersion of the polyisocyanate B and with dispersants C, and fillers D, and if required, further conventional assistants are then added.

8. A process for coating woven and nonwoven substrates, comprising coating said substrate with an aqueous formulations of copolymer latices and polyisocyanate dispersions as claimed in claim 1 or 9.

9. An aqueous formulation as claimed in claim 1, wherein the stabilized polyisocyanates B) are deactivated with compounds having hydroxyl, carboxyl, amide or mercaptan groups.

* * * * *